Patented Feb. 5, 1924.

1,482,389

UNITED STATES PATENT OFFICE.

ALEXANDER L. DUVAL D'ADRIAN, OF WASHINGTON, PENNSYLVANIA.

PROCESS OF AND MIXTURE FOR MAKING GLASS.

No Drawing.   Application filed February 10, 1921.   Serial No. 444,016.

*To all whom it may concern:*

Be it known that I, ALEXANDER L. DUVAL D'ADRIAN, a citizen of France, and a resident of Washington, in the county of Washington and State of Pennsylvania, have invented certain new and useful Improvements in Processes of and Mixtures for Making Glass, of which the following is a full, clear, and exact description.

This invention relates to improvements in processes of and mixtures for making glass, and more particularly to a process and mixture involving the use of a decolorizing agent. It is well known that the iron present in ordinary glass-forming mixtures will impart a greenish color to the glass. This is most undesirable when the object is to produce clear, or colorless glass. I am aware that various decolorizing agents, depending mainly on complementing colors, have been employed with more or less success, and my object is to eliminate the color more effectively than is possible by the use of the old mixtures and processes.

In accordance with the preferred form of the invention, which I will hereafter more fully describe, a novel chemical change takes place when the new glass-forming mixture is heated, and certain highly desirable results are obtained by the chemical action in the mixture. First, some of the iron, which may be in the form of free iron or combinations of iron, is oxidized and converted into higher iron oxides. The lower oxides of iron impart a decided greenish color to the glass, but this is not true of the higher oxides of iron. It is therefore an advantage to convert some of the iron into the higher iron oxides which do not materially color the glass. Second, I convert some of the iron into iron chlorides, which are very volatile and which are carried away from the glass mixture, in the form of vapors.

From the foregoing, it will be understood that some of the iron is converted into higher iron oxides which do not materially color the glass, and that some of the iron is converted into iron chlorides which pass away in the form of vapors, all of which results in the elimination of undesirable coloring material from the glass-forming mixture.

More specifically stated, these results may be accomplished by making the glass-forming mixture in the usual manner, and commingling therewith a chlorine compound such as a chlorine salt capable of acting as an oxidizing agent when the mixture is subjected to the high temperature at which it is melted. This "chlorine" salt is preferably calcium chloride, or some other chlorine combination, for example, chlorinated lime, ammonium chloride, potassium chlorate, etc.

In a glass-forming mixture weighing about 1600 pounds I may use from one-half pound to 50 pounds, or more, of calcium chloride, the exact amount depending upon the nature of the mixture and other conditions. An entirely satisfactory mixture may be made as follows:

Sand _____ 1000 lbs.
Soda ash _____ 360 to 380 lbs.
Limestone _____ 200 to 220 lbs.
Calcium chloride (chlorine salt) __ 2 to 6 lbs.

In addition to the above, some other decolorizer may be added if necessary or desirable. I prefer to add a decolorizer such as manganese, selenium or its salts, nickel salts, etc., for the reason that these decolorizing agents result in actions quite different from the action of chlorine salt which serves as an oxidizing agent, as herein pointed out.

When the mixture is placed in a furnace and subjected to a melting temperature, the chlorine salt serves as an oxidizing agent and oxidizes some of the iron, converting it into higher iron oxides which, as previously stated, do not materially color the glass.

Furthermore, a part of the chlorine combines with some of the iron to form iron chlorides, which are volatile and which pass away from the mixture in the form of vapor.

I claim:

1. A glass-forming mixture containing iron and a chlorine compound adapted to act as an oxidizing agent.

2. A glass-forming mixture containing iron and a chlorine compound adapted to convert iron into higher oxides.

3. A siliceous glass-forming mixture containing iron, and a chlorine salt adapted to convert iron into higher oxides and iron chlorides.

4. A glass-forming mixture containing iron and calcium chloride.

5. In the art of making glass, the process which consists in commingling with a glass-forming mixture containing iron a chlorine compound adapted to act as an oxidizing agent, and then heating the mixture.

6. In the art of making glass, the process which consists in commingling with a glass-forming mixture containing iron, a chlorine salt adapted to act as an oxidizing agent, and heating the mixture to oxidize the iron.

7. In the art of making glass, the decolorizing process which consists in treating a glass-forming mixture containing iron, by melting the mixture and at the same time converting some of the iron into iron chlorides and volatilizing said iron chlorides.

8. In the art of making glass, the decolorizing process which consists in treating a glass-forming mixture containing iron, by melting the mixture and at the same time converting some of the iron into higher oxides and some into iron chlorides and volatilizing said iron chlorides.

9. In the art of making glass, the decolorizing process which consists in commingling therewith a glass-forming mixture containing iron, a chlorine compound which, at a high temperature, is capable of converting iron into higher oxides and which is also capable of combining with iron to form iron chlorides, and then melting the mixture so as to produce said higher oxides and at the same time volatilize said iron chlorides.

10. In the art of making glass, the decolorizing process which consists in commingling therewith a glass-forming mixture containing iron and a suitable decolorizing agent, a chlorine compound which, at a high temperature, is capable of converting iron into higher oxides and which is also capable of combining with iron to form iron chlorides, and then melting the mixture so as to produce said higher oxides and at the same time volatilize said iron chlorides.

11. In the art of making glass, the process which consists in commingling calcium chloride with a glass-forming mixture containing iron, and melting the resultant mixture.

12. In the art of making glass, the process which consists in commingling calcium chloride with a glass-forming mixture containing iron and a suitable decolorizer, and melting the resultant mixture.

13. The process of making glass-like products free from iron contamination, from charge material contaminated with iron, which consists in adding to said charge a chloride in a quantity sufficient to form a volatile chloride with all the iron present; bringing said charge to a temperature sufficient for said iron to react with the added chloride; driving off the iron chloride thus formed; and producing the desired glass-like product therefrom, substantially as described.

In testimony that I claim the foregoing I hereunto affix my signature.

ALEXANDER L. DUVAL d'ADRIAN.